(12) United States Patent
Karla et al.

(10) Patent No.: US 7,035,522 B2
(45) Date of Patent: Apr. 25, 2006

(54) JOINT BETWEEN FIBRE AND SUPPORT WITH COLD WELD FOR AN OPTICAL MODULE

(75) Inventors: Ingo Karla, Schermbeck (DE); Wolfgang Heck, Gerling (DE); Gerhard Luz, Bietigheim-Bissingen (DE)

(73) Assignee: Avanex Corporation, Fremont, CA (US)

( * ) Notice: Subject to any disclaimer, the term of this patent is extended or adjusted under 35 U.S.C. 154(b) by 135 days.

(21) Appl. No.: 10/067,776

(22) Filed: Feb. 8, 2002

(65) Prior Publication Data

US 2002/0136522 A1 Sep. 26, 2002

(30) Foreign Application Priority Data

Mar. 22, 2001 (EP) .............................................. 01440081

(51) Int. Cl.
*G02B 6/00* (2006.01)

(52) U.S. Cl. ......................... 385/137; 385/147; 385/135

(58) Field of Classification Search ................. 385/135, 385/137, 147

See application file for complete search history.

(56) References Cited

U.S. PATENT DOCUMENTS 5,178,319 A    1/1993   Coucoulas

FOREIGN PATENT DOCUMENTS

EP    0 631 162 A1    12/1994

OTHER PUBLICATIONS

Coucoulas A et al.: "Alo Bonding: A Method of Joining Oxide Optical Components to Aluminum Coated Substrates" Proceedings of the Electronic Components and Technology Conference. Orlando, Jun. 1–4, 1993, New York IEEE, US, Bd Conf. 43, 1. pp. 470–481.

*Primary Examiner*—Chandrika Prasad
(74) *Attorney, Agent, or Firm*—Moser, Patterson & Sheridan, L.L.P.

(57) ABSTRACT

An optical module comprises a support (T) on which an optical fibre (F) is mounted. Introduced on the support (T) is a V-groove (VG) that serves only to fix the fibre (F). Applied perpendicularly to the groove (VG) is a strip-shaped contact layer (CL). The fibre (F) is pressed into the groove (VG). When the fibre (F) is pressed into the groove (VG), the contact layer (CL) forms a mechanical joint with the fibre (F) in the form of a cold weld. This functions particularly well in the case of glass fibres having a contact layer of aluminium (Al). The contact layer (CL) is preferably composed of a plurality of narrow strips extending perpendicularly to the groove (VG).

13 Claims, 2 Drawing Sheets

JOINT BETWEEN FIBRE AND SUPPORT WITH COLD WELD FOR AN OPTICAL MODULE

CROSS REFERENCE TO RELATED APPLICATIONS

This application claims priority to European patent application 01440081.6, filed on Mar. 22, 2001.

TECHNICAL FIELD OF THE INVENTION

The invention relates to optical modules, such as those used, for example, in optical communications. Stated more precisely, the invention relates to the mechanical mounting of preferably inorganic optical fibres on a support.

BACKGROUND OF THE INVENTION

Optical modules, such as those used, in particular, in optical communications, comprise optical or optoelectronic components that are disposed on a support and are coupled to one or more optical fibres. The support, which is also described as board or submount, is frequently composed of silicon. To couple the optical fibre, there has been introduced into the support a groove into which the stripped fibre, i.e. the fibre freed of the outer coating, is laid and mounted.

There is a plurality of possibilities for fixing the fibre. The possibility most used is to fix the fibre in the groove with adhesive, generally an epoxy resin. For this purpose, the fibre is aligned in the groove in order to achieve maximum coupling and then fixed with the adhesive. In this process, it may happen that the coupling optimized previously by alignment deteriorates during the curing of the adhesive. The bonding process can at present not be satisfactorily monitored and this leads to deterioration of the optical properties and increase in rejects during production. On the other hand, the bonding point is a weak point in regard to reliability and service life of the optical modules. The adhesive is subject to an ageing process that is promoted by exposure to light. In addition, there is the desire for epoxy-free optical modules.

A further possibility for fixing the fibre on the support is to metallize the fibre and solder it on the support. For this purpose, the metallized fibre is either soldered into a small metal tube on the support or is firmly soldered between the metallized support and a cover plate. This approach is technically very involved and expensive. On the one hand, metallized fibres are very expensive. On the other hand, either a deeper groove has to be etched into the support for the small metal tube, which requires development and design of new supports, or a cover plate has to be provided, which increases the support's surface necessary for the purpose. Both have the result that the supports have to be of larger dimensions so that fewer supports can be produced from a wafer and, in addition, a larger casing is needed for the module. A further disadvantage in soldering fibres is mechanical robustness. Soldered fibres break easily at the edge of the support. Tests have shown that, during tensile loading, the fibres break off, as a rule, before they are pulled out.

From the article entitled "AlO Bonding: A Method of Joining Oxide Optical Components to Aluminum Coated Substrates" by A. Coucoulas et al, 1993, Proceedings of 43$^{rd}$ Electronic Components and Technology Conference, pp. 470–481, it is known, for fixing fairly small optical elements such as ball lenses and for fibres, to coat the elements with $SiO_2$ and press them into an aluminium-coated recess on the support using a thermocompression method. This produces a cold weld between the $SiO_2$ layer of the element and the aluminium coating of the support. For this purpose, a ball lens has to be pressed into a suitable aluminium-coated recess with an application pressure of up to 50 N. In this process, it forms a cold weld at a few contact points. Fibres are pressed into an aluminium-coated V-groove. Since they rest in the V-groove over its entire length, a substantially higher application pressure is needed than for ball lenses. In this process, there is the danger that the support is damaged or destroyed. If a lower application pressure is chosen in order not to damage the support and the fibre, the mechanical joint between fibre and aluminium coating is inadequate.

SUMMARY OF THE INVENTION

The object of the invention is to provide an improved joint between an optical fibre and a support and also a method of producing such a joint.

According to the invention, the object is achieved in that a groove is introduced on the support and a contact layer comprising a plurality of strips extending essentially perpendicularly to the groove (VG) is applied and, on pressing the fibre into the groove, a mechanical joint forms with the fibre.

An advantage of the invention is that the contact between support and fibre is restricted to some fairly small areas or points, as a result of which the application pressure per unit area is higher than in the case of a blanket coating without the maximum pressure that would result in destruction of the support being exceeded. As a result of the higher application pressure per unit coated area, a very rugged joint is produced even if the contact area is small in total.

Further advantages are that the production of the joint is less sensitive to contaminants and that the joint is resistant to breaking of the fibres at the support edge.

BRIEF DESCRIPTION OF THE DRAWINGS

The invention is explained below in two exemplary embodiments with reference to FIGS. 1 to 4. In the figures:

FIG. 2 shows the support from FIG. 1 with fibre pressed in,

DETAILED DESCRIPTION OF THE INVENTION

The invention is based on the basic idea of fixing the fibre on the support by pressing it in. For this purpose, there is applied to the support, in the region of a groove into which the fibre is to be pressed, a contact layer that forms a type of cold weld with the fibre during the pressing-in.

A further basic idea is not to apply the contact layer to the entire length of the groove, but only in small strips that are disposed perpendicularly to the groove. This restricts the contact between fibre and contact layer to a few, spatially clearly defined contact points. Otherwise, i.e. if the contact layer were applied as a blanket to the entire length of the groove, the pressure necessary to achieve the cold weld would be so great that the support would be destroyed during the pressing-in.

Figure 1:
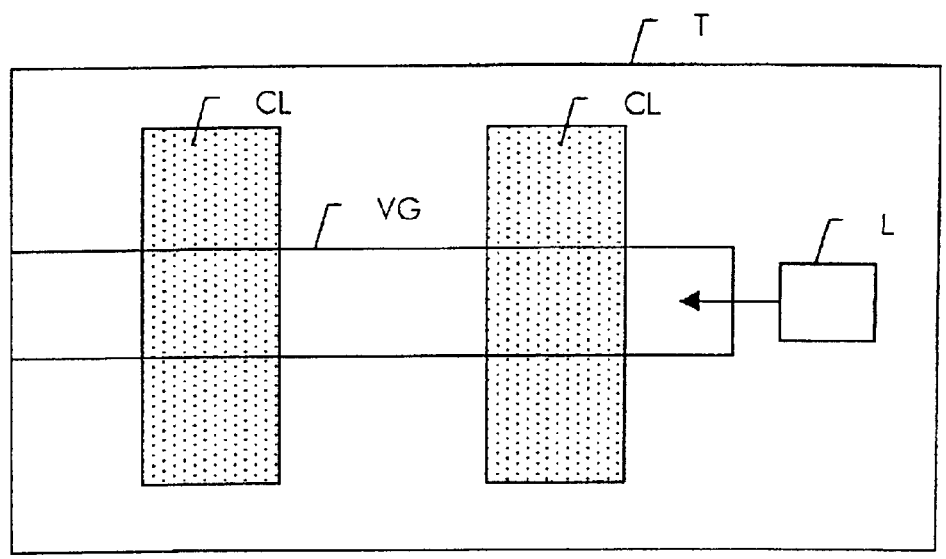
FIG. 1 shows a plan view of a support prepared according to the invention.
Figure 2:
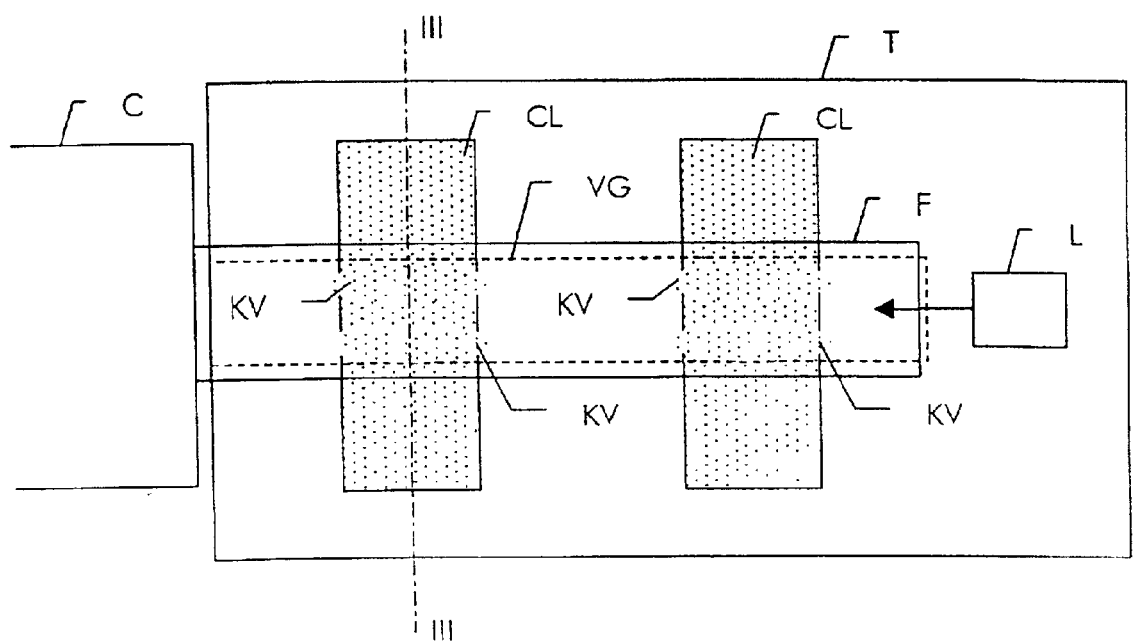
Figure 3:
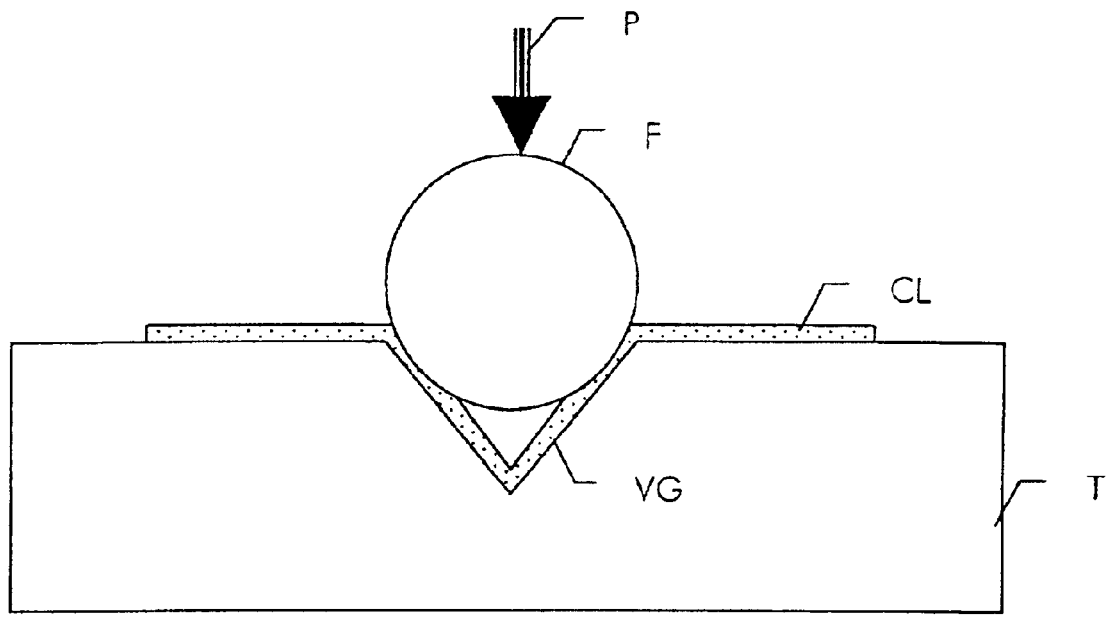
FIG. 3 shows a section along the line III—III.

A first exemplary embodiment of the invention is shown in FIGS. 1 to 3. FIG. 1 shows the support T into which a groove VG is etched. Disposed on the support at the end of the groove is a semiconductor laser L that emits light in the direction of the arrow. A fibre is to be mounted in the groove VG. For this purpose, narrow strips of a contact layer CL are applied perpendicularly to the groove VG.

In the exemplary embodiment, the support is composed of silicon and the contact layer is of aluminium. The groove is a V-groove, i.e. a groove having a V-shaped cross section.

FIG. 2 shows the support T with fibre F, which is composed of glass, i.e. amorphous $SiO_2$, mounted thereon. The fibre F has been freed of its outer coating C over the length of the groove and pressed into the groove. A mechanical joint has been produced between the contact layer and the fibre by pressing the latter on in the four regions KV.

The background of this mechanical joint is that the aluminium enters into a chemical bond with the $SiO_2$ of the fibre. This produces a cold weld, i.e. a weld without the material in the region of the welding point having been fused. In this process, the following reaction takes place exothermally between the metallic aluminium of the contact layer and the silicon oxide of the fibre:

$$3SiO_2 + 4\,Al \rightarrow 2Al_2O_3 + 3Si + energy$$

In FIG. 3 a section is depicted along the line III—III. The fibre F lies in the V-groove VG of the support T. Indicated diagrammatically is the fact that a force P is exerted on the fibre F in order to press it into the V-groove VG. This produces the cold weld with the contact layer CL.

The fibre has a diameter of 125 μm. The chosen width of the contact-layer strips is approximately of the same order of magnitude as the fibre diameter and has a width of 200 μm in the exemplary embodiment. It is advantageous to apply between two and four strips. The total length of the contact area is then just under one millimetre in order of magnitude.

Aluminium is preferred as material for the contact layer since it is ductile and deformable, but nevertheless yields a dense layer and, in addition, can be applied cheaply and simply. In addition, aluminium also frequently occurs in any case in other process steps in the production of optical or optoelectronic circuits in any case. In addition to aluminium, however, other materials, preferably metals, are suitable for the contact layer. If the fibre is not composed of $SiO_2$, it may alternatively also be coated with $SiO_2$. Other materials are also suitable for the fibre or fibre coating. Only the fact that a mechanical joint is produced between the fibre and the contact layer during the pressing-in is important.

The invention is also not restricted to V-shaped grooves. On the contrary, the groove may also be trapezoidal or U-shaped. The shape of the groove generally results from the alignment of the crystal direction during the etching of the groove. It is, however, advantageous if the fibre has, in the groove, well-defined contact points that result from the geometry of the groove and of the fibre diameter.

Figure 4:
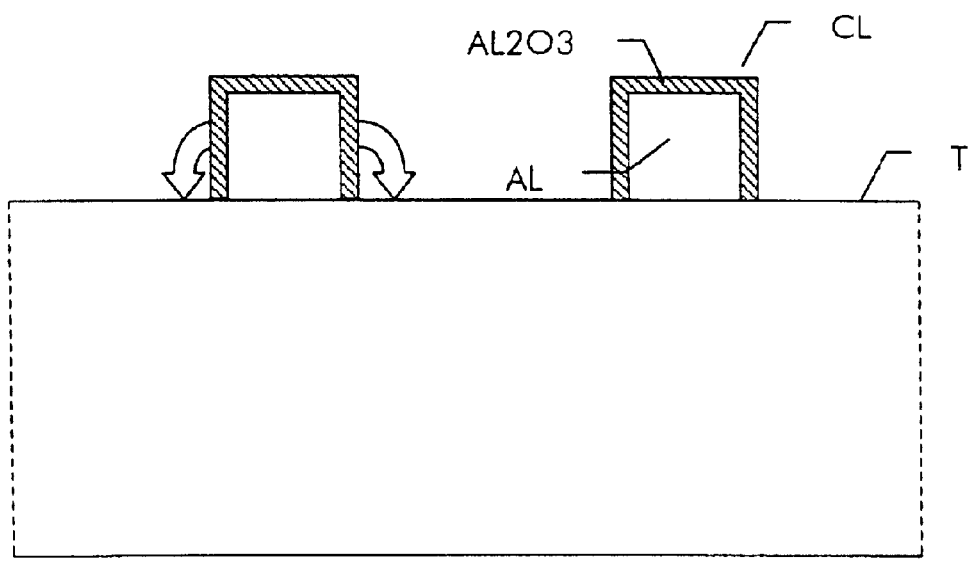
FIG. 4 shows a section perpendicular to the rib-shaped aluminium strips.

In an advantageous development of the invention, a multiplicity of essentially fairly narrow contact-layer strips is applied. The strips then have the shape of individual ribs with free space in between. The chosen width of said ribs can be between a few micrometres and a few tens of micrometres. This has the advantage that the passivating $Al_2O_3$ layer (aluminium oxide) which rapidly forms on metallic aluminium in an oxygen-containing atmosphere, can easily be cracked when the fibre is pressed on and can be pushed aside into the free space. FIG. 4 shows a section that is transverse to such aluminium ribs. Disposed on the support T are two aluminium ribs CL. They are composed of metallic aluminium Al in the centre and a passivating aluminium oxide layer $Al_2O_3$ on their outer surfaces. In the case of the left-hand rib, arrows indicate what happens when the fibre is pressed on: the aluminium oxide layer is cracked on the upper side by the pressure and the aluminium oxide is pressed sideways into the free space. As a result, more elemental aluminium appears on the top in order to form the cold weld with the fibre.

This can be applied in two ways. On the one hand, a continuous aluminium layer can be applied as a blanket and then structured, for example, by etching procedure into a multiplicity of individual ribs. In this case, the ribs have, for example, a width in each case of 10 μm. The free space between the ribs may have a width, for example, of 50 μm. The total length of the contact area is then again just under one millimetre in order of magnitude. Alternatively, the contact-layer strips from the first exemplary embodiment may also be subdivided into a plurality of individual ribs. For example, the 200 μm-wide strips may be subdivided into 10 ribs of 10 μm, with 10 μm of free space between each of them.

The optical module according to the invention is produced as follows. First, a groove is introduced into the support. This takes place in a known manner, for example by wet etching using a lithographically produced mask. The contact layer is then applied.

The contact layer is preferably applied by sputtering. Sputtering is a method of coating by cathode atomization, generally of metals. In a discharge tube, ionized filling-gas molecules are accelerated onto a cathode by an acceleration voltage. The cathode, which is composed of the material that is to be applied, is atomized under these circumstances and the cathode particles attach themselves to the substrate to be coated, in this case the support. Preferably, a mask is aligned in front of the support that has slots for the contact strips. Aluminium particles from the cathode thus pass only through the slots onto the support and attach themselves there in the form of strips.

Alternatively, the contact layer may also be applied as a blanket and then structured by means of known etching procedures to form strips or narrow ribs. This is necessary if particularly narrow contact-layer strips are to be applied.

After applying the contact layer, it is advantageous to keep the support under an inert-gas atmosphere or vacuum until pressing in the fibre in order to avoid oxidation of the surface.

Finally, the stripped fibre is laid in the groove and pressed in at a temperature of between about 200° and 400° C., which produces the mechanical joint between contact layer and fibre. The temperature during pressing-in is preferably between 300° and 350° C., typically, for example, 325° C. In this connection, higher temperatures are in principle desirable, but care has to be taken that the support is not destroyed or detrimentally affected by excessively high temperatures. In the case of a contact layer made of materials other than aluminium, other temperatures may, of course, be necessary during pressing-in.

The width of the contact-layer strips is a compromise between mechanical strength of the joint and permissible application pressure. In the case of a mechanically particularly robust support that can tolerate a higher application pressure, even a continuous contact layer may be expedient in the entire region of the groove. In the case of fairly soft support material, the chosen width of the contact-layer strips has to be smaller. Of course, individual small "islands" of the contact layer may also be applied.

A further advantageous development is to apply the contact layer in such a way that it does not reach to the edge of the support. This takes account of the knowledge that the edge of the support is a potential breakage point for the fibre mounted thereon. If the fibre is rigidly joined to the support up to the edge of the support, there is a great danger that, at low mechanical loading of the fibre, the latter breaks off at the edge. On the other hand, if the contact layer does not quite extend up to the edge, although the fibre is still guided in the last subsection of the groove, it is not rigidly bound at that point. The danger that the fibre breaks at the edge of the support is reduced by the flexibility of the fibre achieved in this way in the last subsection of the groove.

What is claimed is:

1. An optical module containing a support (T) in which a groove (VG) is introduced and an optical fibre (F) mounted in the groove (VG) characterized by a contact layer (CL) that is applied to the support (T) and comprises a plurality of strips extending essentially perpendicularly to the groove (VG) and that forms a mechanical joint with the fibre (F) when the fibre (F) is pressed into the groove (10) in the form of a cold weld.

2. The optical module according to claim 1, in which the strip-shaped contact layer (CL) is composed of aluminum (Al).

3. The optical module according to claim 1, in which the fibre (F) is composed of $SiO_2$ or is coated with $SiO_4$.

4. The optical module according to claim 1, in which between two and four strips having a width of about 200 μm each are provided.

5. The optical module according to claim 1, in which a multiplicity of strips are provided that have a width of up to a few tens of micrometers.

6. The optical module according to claim 1, in which the strips are each structured in turn to form a plurality of narrow ribs.

7. The optical module according to claim 1, in which the groove (VG) is a V-groove.

8. The optical module according to claim 1, in which the last subsection of the groove (VG) in the direction of the support edge is free of the contact layer (CL).

9. A support (T) for an optical module, containing a groove (VG) for fixing an optical fibre (F), characterized by a contact layer (CL) applied to the support (T) and composed of a plurality of strips extending essentially perpendicularly to the groove (VG) and that forms a mechanical joint with the fibre (F) when the fibre (F) is pressed into the groove (VG).

10. A method of producing an optical module containing a support (T) into which a groove (VG) has been introduced and an optical fibre (F) mounted in the groove (VG), comprising the following steps:

introduction of the groove (VG) into the support (T);

application of a contact layer (CL) that is composed of a plurality of strips extending essentially perpendicularly to the groove (VG) and that forms a mechanical joint with the fibre (F) when the fibre (F) is pressed into the groove (VG); and pressing of the optical fibre (F) into the groove (VG) in the form of cold welding.

11. A method according to claim 10, in which the fibre (F) is stripped before being pressed in.

12. The method according to claim 10, in which the contact layer (CL) is applied by sputtering and, in which process, a mask having slots is used for the contact-layer strips.

13. The method according to claim 10, in which the contact layer (CL) is applied as a blanket and then by applying an etching procedure to form strips extending essentially perpendicularly to groove (VG).

* * * * *